(12) United States Patent
Albakri

(10) Patent No.: US 11,330,799 B2
(45) Date of Patent: May 17, 2022

(54) ANIMAL UMBRELLAS

(71) Applicant: Sadeq Albakri, Brooklyn, NY (US)

(72) Inventor: Sadeq Albakri, Brooklyn, NY (US)

(*) Notice: Subject to any disclaimer, the term of this patent is extended or adjusted under 35 U.S.C. 154(b) by 80 days.

(21) Appl. No.: 17/086,930

(22) Filed: Nov. 2, 2020

(65) Prior Publication Data
US 2021/0144967 A1 May 20, 2021

Related U.S. Application Data

(60) Provisional application No. 62/938,079, filed on Nov. 20, 2019.

(51) Int. Cl.
*A01K 27/00* (2006.01)
*A01K 13/00* (2006.01)
*A45B 11/02* (2006.01)

(52) U.S. Cl.
CPC .......... *A01K 13/006* (2013.01); *A01K 27/002* (2013.01); *A01K 27/003* (2013.01); *A45B 11/02* (2013.01)

(58) Field of Classification Search
CPC .............................. A45B 11/02; A01K 13/006
See application file for complete search history.

(56) References Cited

U.S. PATENT DOCUMENTS

| | | | |
|---|---|---|---|
| 6,035,873 A * | 3/2000 | Lin | A45B 19/10 135/25.4 |
| 6,371,686 B1 * | 4/2002 | Wu | F16B 7/105 135/25.1 |
| 8,413,670 B1 * | 4/2013 | Richardson, Jr. | A01K 27/002 135/15.1 |
| 10,835,004 B2 * | 11/2020 | Scrone-Smith | A45B 11/00 |
| 2004/0069334 A1 * | 4/2004 | Ko | A45B 19/04 135/25.4 |
| 2008/0289586 A1 * | 11/2008 | O'Connor | A45B 11/02 135/16 |
| 2013/0087177 A1 * | 4/2013 | Muinde | A45B 19/04 135/25.4 |
| 2018/0140060 A1 * | 5/2018 | Ferrara | A45B 23/00 |

* cited by examiner

*Primary Examiner* — Joshua D Huson
*Assistant Examiner* — Edgar Reyes
(74) *Attorney, Agent, or Firm* — Bruce A. Lev

(57) ABSTRACT

Animal umbrellas adapted to protect animals, more specifically household pets, from precipitation and sun radiation. The animal umbrellas include a shade held at a distance from an animal's body by a plurality of ribs and stretchers, and is attached and extends from at least one collar or harness placed on the animal. A leash can be incorporated and releasably attached thereto.

17 Claims, 4 Drawing Sheets

ANIMAL UMBRELLAS

CROSS-REFERENCE TO RELATED APPLICATION

The present application is related to and claims priority from provisional application Ser. No. 62/938,079, filed Nov. 20, 2019, which is incorporated herein by reference.

BACKGROUND OF THE INVENTION

1. Field of the Invention

The present invention relates generally to the field of umbrellas and more specifically relates to umbrellas for animals.

2. Description of the Related Art

Keeping animals protected from rain and the damaging effects of the sun's radiation is as important as that for humans.

Various types of clothing have been developed to protect animals but they do not offer rain and sun radiation protection. Therefore a need exists to develop an apparatus to protect animals, more specifically household pets, from rain and sun radiation.

BRIEF SUMMARY OF THE INVENTION

In view of the foregoing disadvantages inherent in the field of animal protection, the general purpose of the present invention, which will be described subsequently in greater detail, is to provide an apparatus to protect animals, more specifically household pets, from rain and sun radiation. The animal umbrella includes a shade held at a distance from an animal's body by a plurality of ribs and stretchers, and is attached and extends from at least one collar or harness placed on the animal. A leash can be incorporated as well and releasably attached thereto.

The features of the invention which are believed to be novel are pointed out in the concluding portion of the specification. These and other features, aspects, and advantages of the present invention will become better understood with reference to the following drawings and detailed description.

BRIEF DESCRIPTION OF THE DRAWINGS

The figure(s) which accompany the written portion of this specification illustrate embodiments and method(s) of use for the present invention, Animal Umbrellas, constructed and operative according to the teachings of the present invention.

Figure 1:
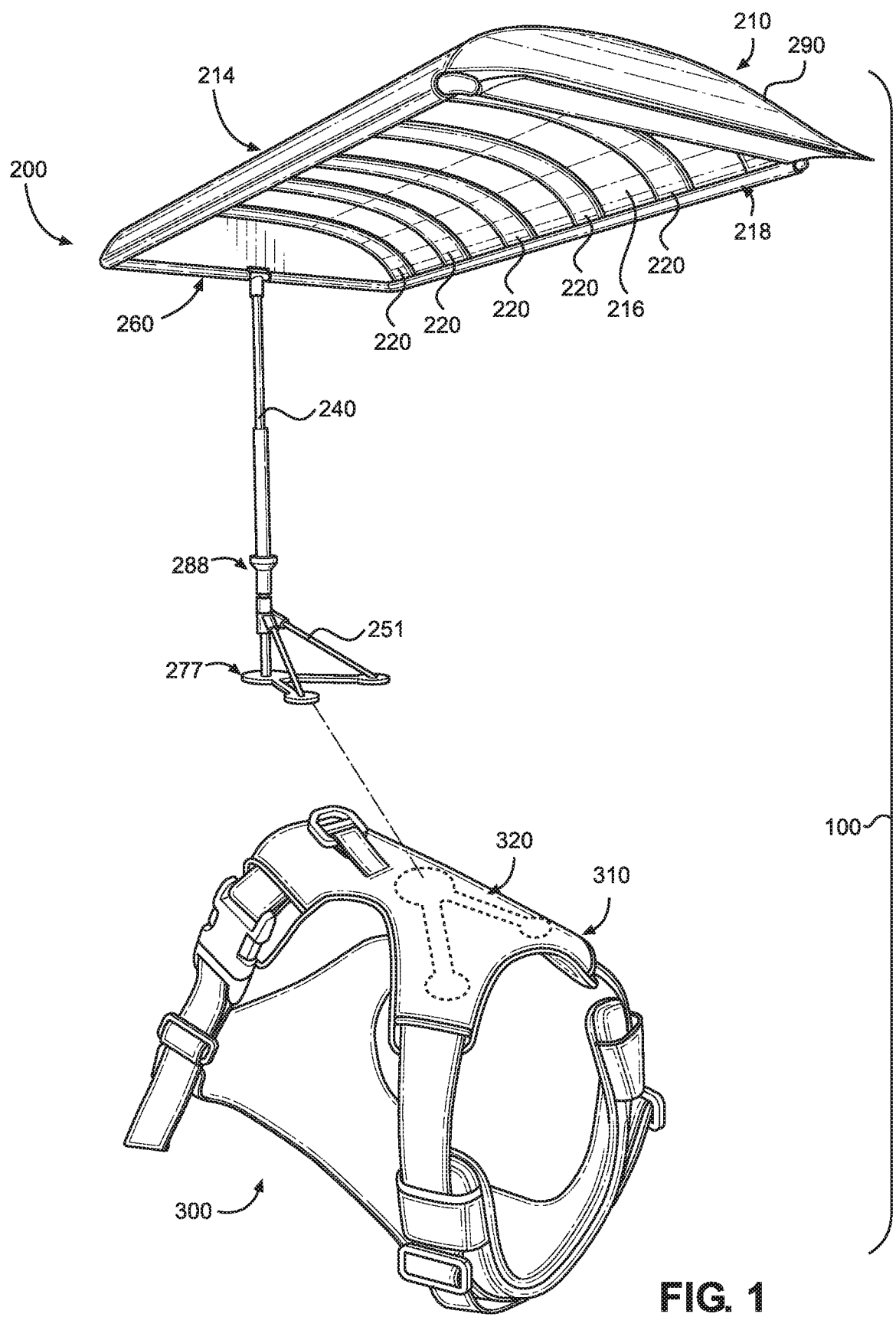
FIG. 1 shows a perspective view illustrating an Animal Umbrella according to a first embodiment of the present invention.

The various embodiments of the present invention will hereinafter be described in conjunction with the appended drawings.

DETAILED DESCRIPTION

As discussed above, embodiments of the present invention relate to an Animal Umbrella used to protect animals, more specifically household pets, from rain and sun radiation.

The animal umbrella is made from a flexible material that is weather proof, thereby repelling rain, snow, and ice, and acts as a sunscreen as well, and includes a frame adapted to hold the flexible material a distance away from the animal's body and can include rigid, extendable, and movable ribs or wires. Further, an animal harness or the like can be used to connect the umbrella to the animal, and a connector incorporated to attach the umbrella to the animal harness, which can be rigid, extendable, and movable. A leash can be incorporated as well and releasably attached to thereto.

Referring now to the drawings FIGS. 1-4, an animal umbrella 100 for shading and protecting animals is shown comprising a shade 200 comprising a panel 210 including a top surface 214, a bottom surface 216, and an outer perimeter 218, wherein the panel is adapted to protect an animal from precipitation and sunlight, and at least one elongated rib 220 connected to the panel and is adapted hold the panel in a desired shape; at least one connector 300 adapted to be releasably connected to the animal; and at least one elongated stretcher 240 including a proximal end 242 releasably connected to the connector, and a distal end 244 releasably connected to a respective one of the plurality of elongated ribs 220, wherein the at least one elongated stretcher 240 is adapted to hold the panel 210 in a desired position above the animal, wherein the shade 200 is adapted to be held above and spaced from the animal, and wherein the animal umbrella 100 is adapted to shade and protect the animal from precipitation and sunlight.

The panel 210 may be formed from a flexible material including plastic, nylon, cotton, silk, or polyvinyl ethers; and may be embedded with sunscreening chemical compounds including homosalate, octinoxate, octisalate, oxybenzone, octocrylene zinc oxide, or titanium dioxide, and any combination thereof. Further, the panel 210 may include an elongated stiffener 260 extending along and in proximity to the outer perimeter thereof. Furthermore, the panel 210 of may further include an elongated stiffener 280 extending between spaced sections of the outer perimeter. In the preferred embodiment, shown in FIG. 3, the elongated stiffeners, 260 and 280, include telescoping tubes making them adjustable in length. These particular telescoping tubes are held in place with respect to one another via friction between them. The panel may also include an openable flap 290 to allow air in and out for the animal. The flap 290 may be opened and closed via at least one fastener which can be formed as a zipper 292 or a series of snaps, 294 and 296.

Figure 3:
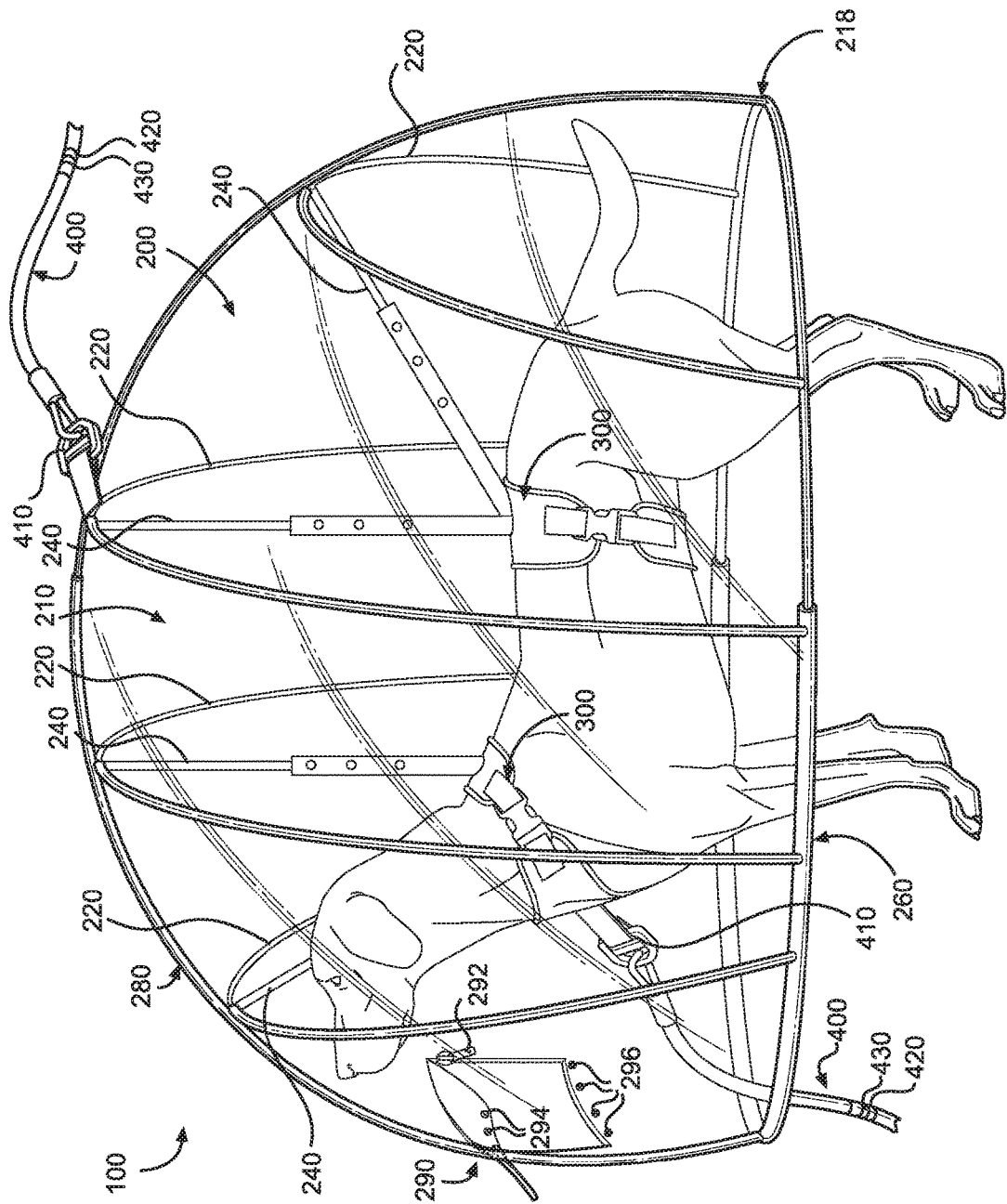
FIG. 3 shows a perspective view illustrating the Animal Umbrella upon an animal according to the preferred embodiment of the present invention.

As shown in FIG. 3, in the preferred embodiment the shade 200 is formed in the shape of a dome adapted to surround top and side portions of the animal.

Figure 4:
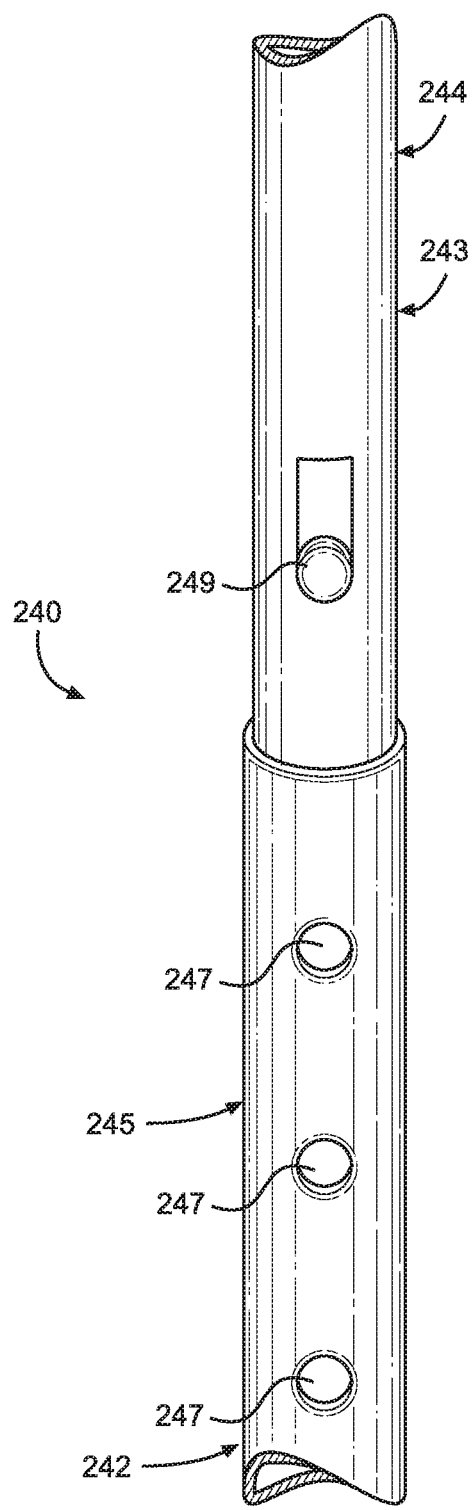
FIG. 4 shows a perspective view illustrating an elongated stretcher incorporating a spring button and a series of holes as the releasable lock according to the embodiment of the present invention in FIG. 3.

As shown in FIG. 4, each of the at least one elongated stretcher 240 may be formed comprises two telescoping tubes, 243 and 245, and a releasable lock adapted to releasably hold the two telescoping tubes at chosen positions with respect to one another, such that each of the at least one elongated stretcher can be adjusted to a desired length. In a preferred embodiment, a first of the two telescoping tubes 245 includes a series of spaced holes 247 therethrough, and a second of the telescoping tubes 243 includes a spring button 249 thereon adapted to releasably engage the series of spaced holes of the first of the two telescoping tubes, such that when a chosen length of each one of the at least one elongated stretcher 240 is achieved a respective spring button 249 of the second telescoping tube 243 engages a respective hole 247 of the first telescoping tube to hold each of the at least one elongated stretcher at a chosen desired length.

As shown in FIG. 3, there can be a plurality of ribs 220 on the shade; and a plurality of stretchers 240 extending from the at least one connector 300, wherein each respective stretcher 240 is connected between the connector 300 and a respective rib 220 on the shade. Furthermore, there can be a plurality of connectors 300, wherein the plurality of ribs 220 are connected to the shade 200 in a spaced relationship to one another, wherein the plurality of connectors 300 are adapted to be connected to the animal in a spaced relationship to one another, and wherein each one of the plurality of stretchers 240 are connected between a respective one of the plurality of connectors 300 and a respective one of the plurality of ribs 220 on the shade 200.

As shown in FIGS. 1 and 3, the at least one connector 300 may be formed as an adjustable removable strap adapted to surround a portion of said animal's body, or as an adjustable removable harness adapted to surround a portion of the animal's body. The harness, as shown in FIG. 1, may include a base plate 310 including a V-shaped connector portion 320 thereon; and the proximal end of the at least one elongated stretcher 240 includes a V-shaped connector portion 277 thereon adapted to releasably connect with the V-shaped connector portion 330 of the base plate 310 of the harness. Further, the at least one elongated stretcher 240 may include an elongated brace 251 connected between a center section of the elongated stretcher and the V-shaped connector portion 277 thereof that is adapted to hold the elongated stretcher 240 in an upright position when attached to the base plate 310 of the harness. Furthermore, the at least one elongated stretcher 240 further comprises a ball joint 288 within one the telescoping tubes, 243 and 245, adapted to allow angular adjustments of the at least one elongated stretcher 240 and thereby angular adjustments of the shade 200 with respect to the animal.

The shade 200 may also further comprise a canopy 290 connected to and extending outwardly from the outer perimeter of the panel and is adapted to prevent moisture from running off the shade and onto the head of an animal wearing the animal umbrella.

Figure 2:
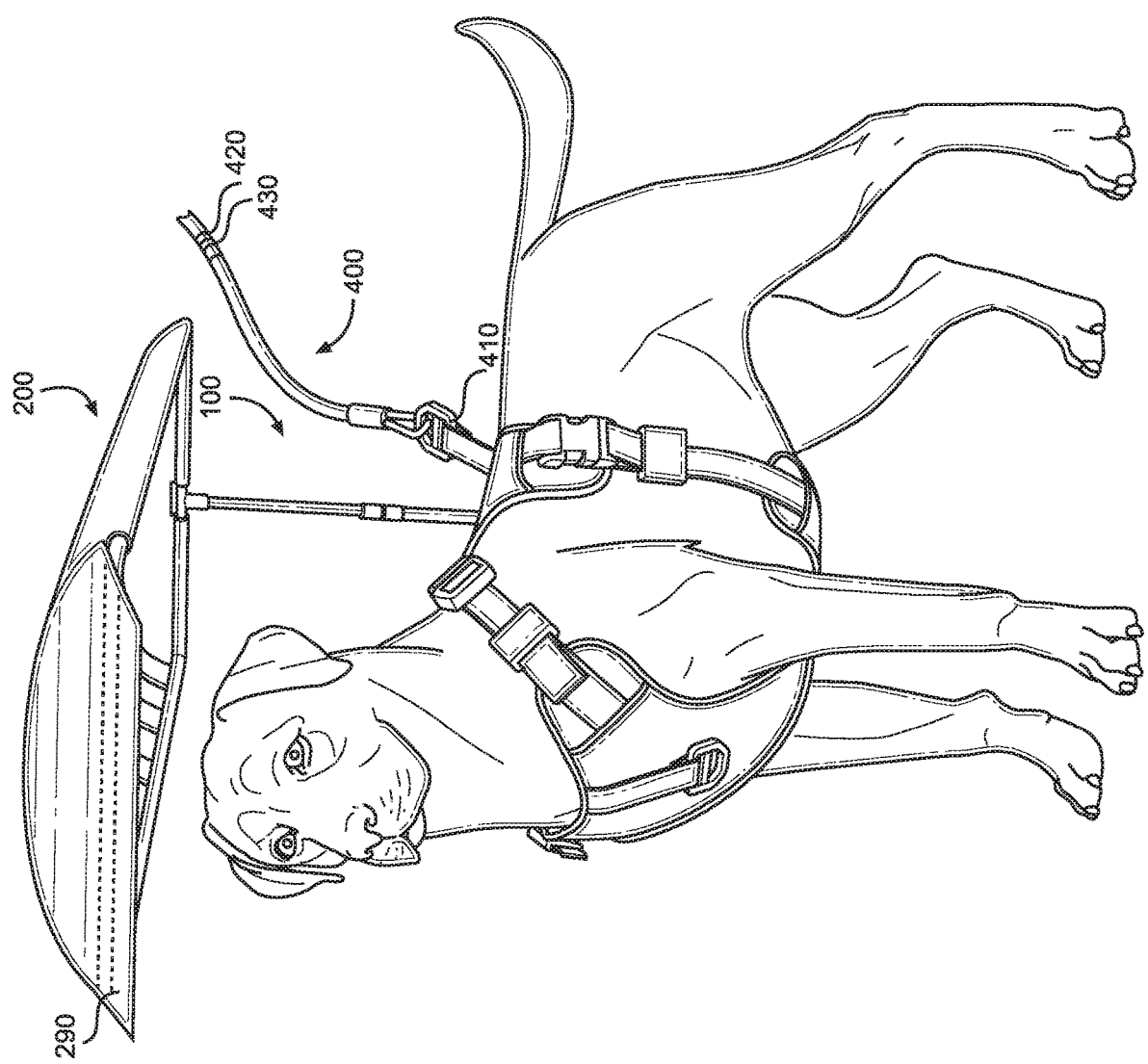
FIG. 2 shows a perspective view illustrating an Animal Umbrella upon an animal according to the first embodiment of the present invention.

As shown in FIGS. 2 and 3, the animal umbrella may further comprise an elongated leash 400 including an attachment end 410 adapted to be releasably attached to one of the at least one connector 300 or the at least one rib 220, and a handle end 420 including a handle 430 adapted to allow a user to releasably hold the leash when attached to the one of the at least one connector 300.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An animal umbrella for shading and protecting animals, comprising:
   a shade comprising:
      a panel including;
         a top surface;
         a bottom surface; and
         an outer perimeter;
         wherein said panel is adapted to protect an animal from precipitation and sunlight; and
      at least one elongated rib;
         wherein said at least one elongated rib is connected to said panel and is adapted hold said panel in a desired shape;
   at least one connector;
      wherein said at least one connector is adapted to be releasably connected to said animal; and
   at least one elongated stretcher including:
      a proximal end releasably connected to said connector; and
      a distal end releasably connected to a respective one of said at least one elongated rib;
      wherein said at least one elongated stretcher is adapted to hold said panel in a desired position above said animal;
   wherein said shade is adapted to be held above and spaced from said animal; and
   wherein said animal umbrella is adapted to shade and protect said animal from precipitation and sunlight; and
   wherein said at least one connector is formed as an adjustable removable harness adapted to surround a portion of animal's body;
   wherein said harness includes a base plate including a V-shaped connector portion thereon; and
   said proximal end of said at least one elongated stretcher includes a V-shaped connector portion thereon adapted to releasably connect with said V-shaped connector portion of said base plate of said harness.

2. The animal umbrella of claim 1, wherein said panel is formed from a flexible material chosen from a group of flexible materials including plastic, nylon, cotton, silk, and polyvinyl ethers.

3. The animal umbrella of claim 1, wherein said panel and is embedded with sunscreening chemical compounds chosen from a list of sunscreening chemical compounds consisting of homosalate, octinoxate, octisalate, oxybenzone, octocrylene zinc oxide, titanium dioxide, and any combination thereof.

4. The animal umbrella of claim 1, wherein each of said at least one elongated stretcher comprises two telescoping tubes and a releasable lock adapted to releasably hold said two telescoping tubes at chosen positions with respect to one another, such that each of said at least one elongated stretcher can be adjusted to a desired length.

5. The animal umbrella of claim 4, wherein a first of said two telescoping tubes includes a series of spaced holes therethrough; and wherein a second of said telescoping tubes includes a spring button thereon adapted to releasably engage said series of spaced holes of said first of said two telescoping tubes, such that when a chosen length of each one of said at least one elongated stretcher is achieved a respective spring button of said second telescoping tube engages a respective hole of said first telescoping tube to hold each of said at least one elongated stretcher at a chosen desired length.

6. The animal umbrella of claim 4, wherein said at least one elongated stretcher further comprises a ball joint within one said telescoping tubes adapted to allow angular adjustments of said at least one elongated stretcher and thereby angular adjustments of said shade with respect to said animal.

7. The animal umbrella of claim 1, wherein said at least one elongated stretcher further includes an elongated brace connected between a center section of said elongated stretcher and said V-shaped connector portion thereof adapted to hold said elongated stretcher in an upright position when attached to said base plate of said harness.

8. The animal umbrella of claim 1, wherein there are a plurality of elongated ribs on said shade; and a plurality of stretchers extending from said at least one connector; wherein each respective stretcher is connected between said connector and a respective one of said plurality of elongated ribs on said shade.

9. The animal umbrella of claim 1, wherein there are a plurality of elongated ribs on said shade; a plurality of stretchers; and a plurality of connectors; wherein said plurality of elongated ribs are connected to said shade in a spaced relationship to one another; wherein said plurality of connectors are adapted to be connected to said animal in a spaced relationship to one another; and wherein each one of said plurality of stretchers are connected between a respective one of said plurality of connectors and a respective one of said plurality of elongated ribs on said shade.

10. The animal umbrella of claim 9, wherein said panel of said shade further includes an elongated stiffener extending between spaced sections of said outer perimeter.

11. The animal umbrella of claim 1, wherein said panel of said shade further includes an elongated stiffener extending along and in proximity to said outer perimeter thereof.

12. The animal umbrella of claim 11, wherein said elongated stiffener includes a plurality of telescoping tubes; and wherein said stiffener is adjustable in length via said telescopic tubes, and are adapted to be held in place with respect to one another via friction between said telescoping tubes.

13. The animal umbrella of claim 1, wherein said shade is formed in the shape of a dome adapted to surround top and side portions of said animal.

14. The animal umbrella of claim 13, wherein said panel further includes a flap that is adapted to open and closed via at least one fastener and used to allow air in and out of said dome-shape for the animal to more easily obtain air therein.

15. The animal umbrella of claim 1, wherein said a shade further comprises a canopy connected to and extending outwardly from said outer perimeter of said panel and is adapted to prevent moisture from running off said shade and onto the head of an animal wearing said animal umbrella.

16. The animal umbrella of claim 1, further comprising:
an elongated leash including:
an attachment end;
wherein said attachment end is adapted to be releasably
attached to one of said at least one connector; and
a handle end including:
a handle;
wherein said handle is adapted to allow a user to releasably hold said leash when attached to said one of said at least one connector.

17. The animal umbrella of claim 1, further comprising:
an elongated leash including:
an attachment end;
wherein said attachment end is adapted to be releasably attached to one of said at least one elongated rib; and
a handle end including:
a handle;
wherein said handle is adapted to allow a user to releasably hold said leash when attached to said one of said at least one elongated rib.

* * * * *